US008397630B2

(12) United States Patent
Oswald (10) Patent No.: US 8,397,630 B2
(45) Date of Patent: Mar. 19, 2013

(54) FOOD COOKER

(76) Inventor: Chad W. Oswald, Palmyra, PA (US)

( * ) Notice: Subject to any disclaimer, the term of this patent is extended or adjusted under 35 U.S.C. 154(b) by 388 days.

(21) Appl. No.: 12/724,705

(22) Filed: Mar. 16, 2010

(65) Prior Publication Data

US 2011/0226135 A1 Sep. 22, 2011

(51) Int. Cl.
*A47J 37/04* (2006.01)
*A47J 27/04* (2006.01)
(52) U.S. Cl. ........................................................ 99/346
(58) Field of Classification Search .................... 99/346, 99/345, 421 V, 419
See application file for complete search history.

(56) References Cited

U.S. PATENT DOCUMENTS

| | | | |
|---|---|---|---|
| 2,350,623 A | 6/1944 | Kruea | |
| 2,602,391 A | 7/1952 | Pedranti et al. | |
| 2,821,904 A | 2/1958 | Arcabosso | |
| 3,379,118 A | 4/1968 | Perez | |
| 3,908,532 A * | 9/1975 | Underwood | 99/347 |
| 4,452,132 A * | 6/1984 | Miller et al. | 99/483 |
| 5,797,312 A * | 8/1998 | Brant | 99/415 |
| 5,913,965 A * | 6/1999 | Gargano | 99/346 |
| 6,062,131 A * | 5/2000 | Holland | 99/345 |
| 6,125,739 A * | 10/2000 | Jernigan | 99/345 |
| 6,192,792 B1 * | 2/2001 | Gremillion | 99/426 |
| 6,487,964 B2 | 12/2002 | Snoke et al. | |
| 6,502,501 B1 | 1/2003 | Simon | |
| 6,796,219 B1 * | 9/2004 | Rubin | 99/346 |
| 7,144,596 B2 | 12/2006 | Snoke et al. | |
| 7,146,905 B2 | 12/2006 | Scharbo et al. | |
| 7,549,369 B2 * | 6/2009 | Zimmerman | 99/532 |
| 2003/0056656 A1 * | 3/2003 | Marco, Jr. | 99/345 |
| 2004/0187699 A1 * | 9/2004 | Citrynell et al. | 99/345 |
| 2005/0039609 A1 * | 2/2005 | Scharbo et al. | 99/419 |
| 2011/0226135 A1 * | 9/2011 | Oswald | 99/419 |

OTHER PUBLICATIONS (http://www.sportsmansguide.com), web-site pages pages, 2 pages. (No date provided).
(http://www.mydeco.com), GrillPro Stainless Steel Chicken at BBQ. co.uk, 1 web-site page, dated Aug. 20, 2009.
(http://www.amazon.co.uk) Oven & BBQ Chicken Roaster with Marinade Infuser, 3 web-site pages dated Aug. 20, 2009.

* cited by examiner

*Primary Examiner* — Raleigh W. Chiu
(74) *Attorney, Agent, or Firm* — Barley Snyder (57) ABSTRACT

A food cooker is provided that is configured to cook and infuse skewered food, the food cooker having perforated spines adjustably positionable on a sealable chamber that support the skewered food.
The food cooker includes a bottom container, a cover connectable with the bottom container, a spine securable at adjustable positions along the cover, a spine, a securing mechanism. The spine has a hollow interior and perforations along an exterior surface. The securing mechanism seals the bottom container and cover to form a sealed inner chamber.

27 Claims, 9 Drawing Sheets

FOOD COOKER

FIELD OF THE INVENTION

The invention relates to a food cooker, in particular, the invention relates to a food cooker having a sealed inner chamber and spines securable at various positions to support and cook food.

BACKGROUND

Barbecue grills are well-known for use in cooking and preparing food. While various styles and cooking methods are utilized, a grill generally cooks food by directing heat at the food from below a supportive surface. Regardless of the heat source type (i.e. wood, coals, gas, etc.), grills present problems in cooking the food. For instance, it is often difficult to thoroughly and evenly cook, or even prepare the food. Accordingly, users have developed various devices and methods to promote more efficient cooking, while others assist in flavoring of the food. For example, rotisserie and smoking devices have been devised.

Rotisserie style cooking involves the rotation of food over a heat source. This technique requires a device that simultaneously supports and rotates the meat above direct heat. Generally, long rods or baskets may be used to skewer or hold food, which is then mechanically or manually rotated to evenly cook the surface of the food. While rotation of the food evenly cooks the food, the exterior surface cooks more quickly than the inner contents.

Smoking style cooking is another developed technique to prepare food in a barbecue grill. This technique flavors, cooks, and/or preserves food by exposing it to the smoke from a device holding burning or smoldering plant materials (i.e. wood). Generally, a smoking device, when used in a barbecue grill, is a perforated metal box holding water-soaked wood smoking chips. The box is positioned on the grill's supportive surface, which is above the heat source and next to the food. As the chips dry out, smoke encompasses surface area of the food, which then provides a unique flavor. Although the smoking devices provide unique flavor and help prevent the meat from drying out, the flavors are applied unevenly and generally limited to woods chips.

In yet another cooking method, U.S. Pat. No. 6,502,501 discloses an apparatus for cooking poultry, which consists of a shallow pan and a lid. The lid fits over the pan, and includes multiple drain holes and a centrally located opening. The lid holds an upwardly extending, hollow, perforated poultry-supporting tower on its upper surface. This detachable tower is mounted over the centrally located opening such that steam generated within the pan during cooking rises up into the tower, and escapes through perforations in the detachable tower. The steam infuses into the center of the poultry, much like a so called "beer can chicken". The tower is detachable from the lid, and is interchangeable with alternative towers of differing lengths and circumferences to accommodate various sizes of poultry. The '501 patent discloses a device that only accommodates poultry. Infusing heat and flavor into the center of other types of food, such as, for example, extremities of poultry would be more difficult. Furthermore, other problems occur with such a design. For instance, steam vented from this design cannot infuse the food efficiently, and the design does not employ a sealed chamber to divert the steam appropriately.

SUMMARY

In light of the shortcomings of the prior art, and long felt need for an inexpensive device, the invention provides a food cooker configured to cook and infuse skewered food.

The food cooker includes a bottom container, a cover connectable with the bottom container, and a removable spine securable at adjustable positions along the cover. The spine has a hollow interior and perforations along an exterior surface, and a securing mechanism sealing the bottom container and cover to form a sealed inner chamber.

BRIEF DESCRIPTION OF THE DRAWINGS

The invention will be explained in greater detail in the following with reference to embodiments, referring to the appended drawings, in which.

DETAILED DESCRIPTION OF THE EMBODIMENT(S)

Figure 1:
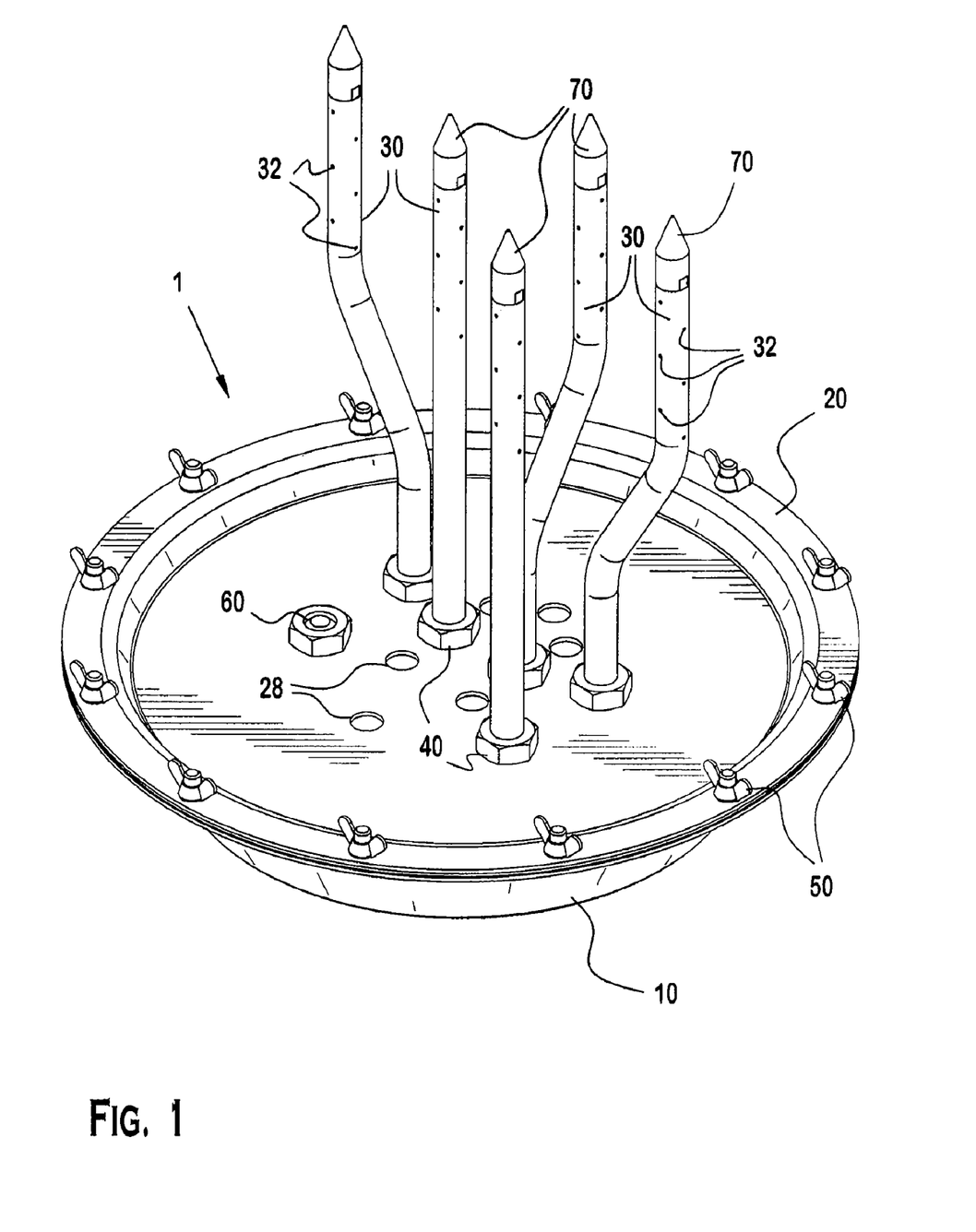
FIG. 1 is a perspective view of a food cooker according to the invention.

The invention will now be described in greater detail with reference to the drawings. Referring first to FIG. 1, a food cooker 1 is shown, having a bottom container 10, a cover 20, at least one spine 30 optionally securable along a plurality of positions along the cover, an attachment mechanism 40, a securing mechanism 50, and an optional restriction device 60, if needed. Each of the aforementioned components connect with each other to create a sealed food cooker 1, which is then positionable over a heating source, such as a supportive surface (not shown) of a grill or another suitable heat source.

Figure 2:
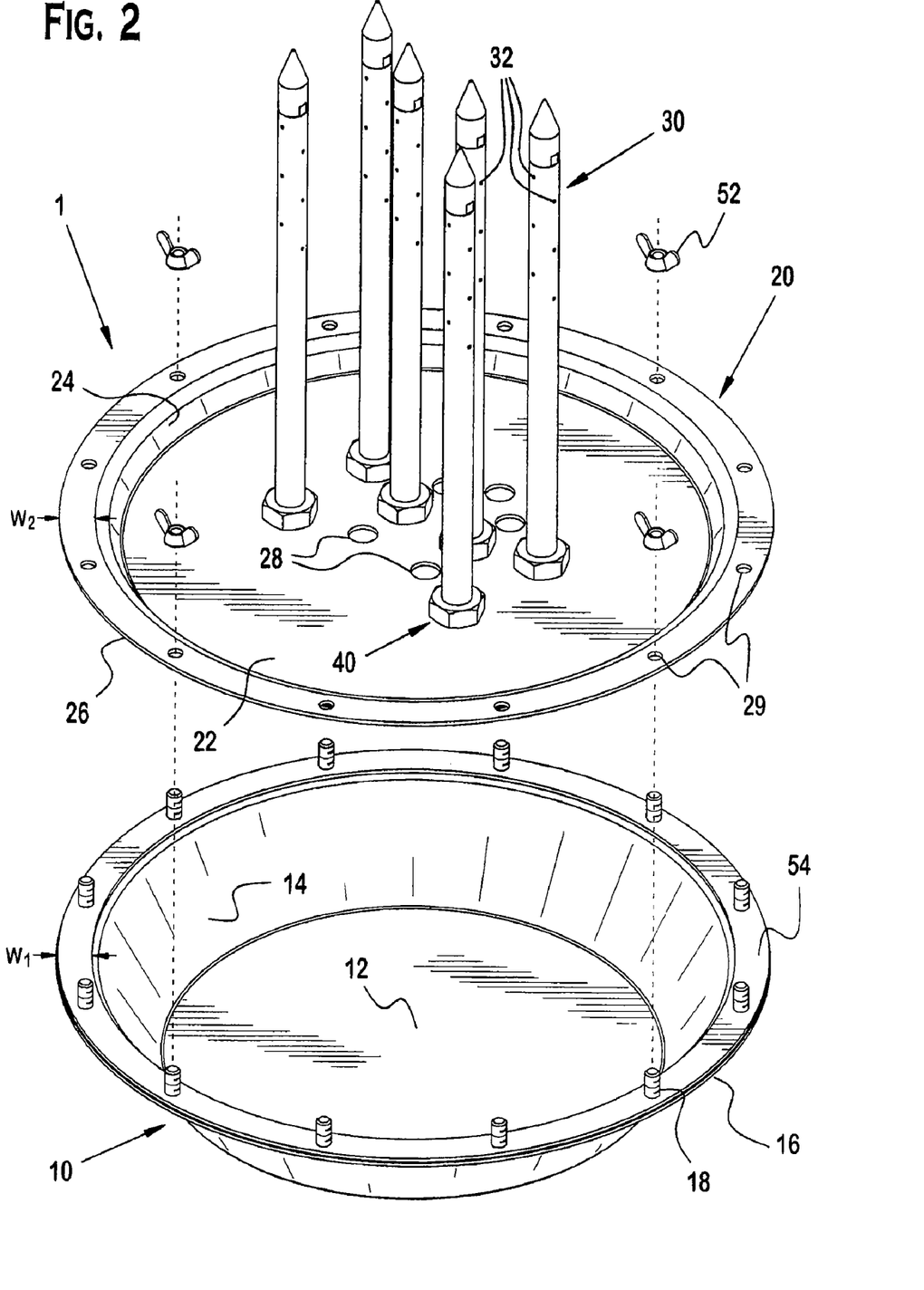
FIG. 2 is a perspective exploded view of another food cooker according to the invention.

With reference to FIG. 2, the bottom container 10 includes a base 12, base sidewall 14, and a flange 16. In the embodiment shown, the bottom container 10 is formed as a one-piece construction and has a substantially concave shape, like or similar to a dish, pan, or pie plate. The base sidewall 14 extends from the base 12 and connect to the flange 16. Therefore, the bottom container 10 is configured to retain fluid/particulate 4 positioned by the user on the base 12 (see also FIG. 3). Depending on the configuration of the bottom container 10, a plurality of base sidewalls 14 may be utilized.

Although the food cooker 1 is illustrated as having a circular shape, the shape and dimensional configurations of the food cooker 1, and its components, may be in the shape of various polygons, including circles, square, rectangles, etc.

The base 12 has a substantially planar surface and is configured to provide stability for the food cooker 1, when the food cooker 1 is positioned on the heating source. It is also possible that the base 12 is non-planar, instead, having ridges, steps, grooves, etc. In fact, it is possible that the base 12 be spherical in shape (i.e. half sphere structure), directly connecting to the flange 16 of the bottom container 10. As a result, the base sidewall 14 is not needed, as a spherical base 12 would be capable of retaining user positioned fluid/particulate 4 (i.e. gases, liquids, fluidized solids, or slurries).

In the embodiment shown, the base 12, as well as many of the components of the food cooker 1, are conductive, where such a design facilitates the heating of fluid/particulate 4 placed in or on the food cooker 1.

Figure 12:
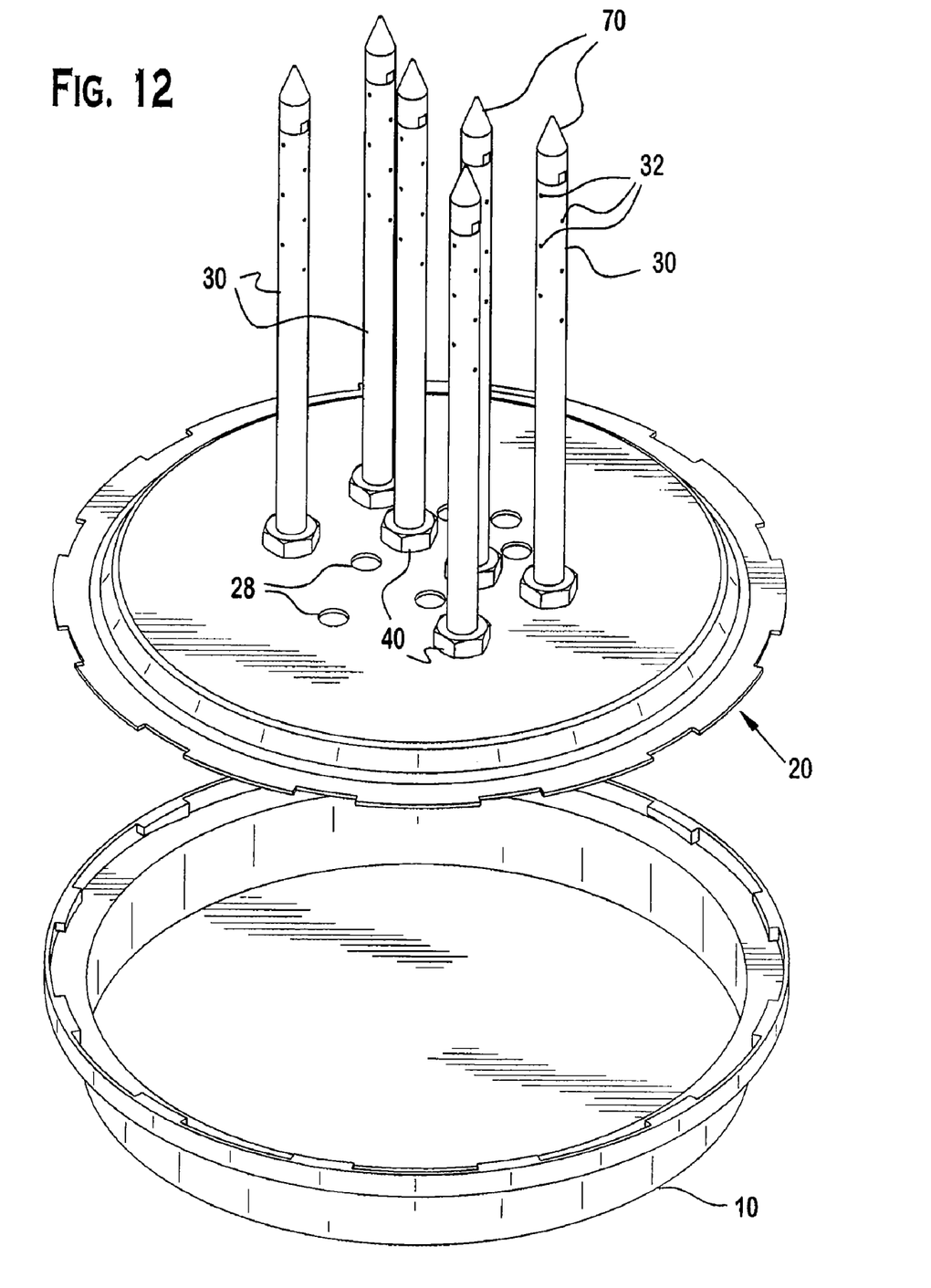
FIG. 12 is a perspective view showing another food cooker according to the invention.

In the embodiment shown, the base 12 has a smaller diameter than the flange 16. Therefore, the base sidewall 14 is angled, extending toward a surface edge of the flange 16. However, the base 12 could have a diameter equal to or greater than the flange 12, and as a result, the length and angle of the base sidewall 14 may vary. In other embodiments, the base sidewall 14 may be positioned substantially perpendicular to the base 12 and flange 16 (see FIG. 12).

The flange 16 of the bottom container 10 connects to the base 12 via the base sidewall 14. However, it is also possible that the flange 16 directly connect to the base 10 in other embodiments. The flange 16 provides a surface connection point between the bottom container 10 and the cover 20, as well as a stable structural component to support a connecting cover 20. In the embodiment shown, the flange 16 has a substantially planar surface, which accommodates the cover 20 in such a way that assembly between the bottom container 10 and cover 20 is uniform and secure.

The flange 16 may extend inward or outward from a proximal end of the base sidewall 14 or connecting base 12. In the embodiment shown, the flange 16 includes several projections 18 extending away from the base 10 and toward the cover 20. These projections 18 are connectable with the securing mechanism 50 and positionable through with cover 20. The projections 18 may be integrally formed on the flange 16, or a separate component that rigidly connects with the bottom container 10.

A sealing member 54 may be used in certain aspects of the invention. The sealing member 54 is positionable on a top surface of the flange 16. The sealing member 54, such as a gasket, is used to assist in creating a seal between the bottom container 10 and cover 20 when assembled. For instance, if the flange 16 is not substantially planar or there are surface irregularities on the connecting components, the sealing member 54 could void those irregularities and assist in preparing a sealed connection between connecting components (e.g. the bottom container 10 and the cover 10). Other sealing members (not shown) could be used at other connection points to facilitate a thorough seal. Since the food cooker 1 provides a sealed, pressurized inner chamber 2 during assembly, the seal between connecting components is important.

In the embodiment shown, the bottom container 10 is prepared from a single piece of conductive material (i.e. stainless steel). However, it is possible to manufacture the food cooker 1 component from ceramic or polymer materials, each having a high melting point. It is also possible to manufacturer the bottom container 10 from separate components, which are then assembled into an integral construction. However, it is important that the bottom container 10 be capable of retaining fluid/particulate 4 (i.e. gases, liquids, fluidized solids, or slurries).

In addition, an inner surface of the bottom container 10, as well as any surface of the food cooker 1, may be coated with a substance, such as polytetrafluoroethylene (PTFE), which minimizes sticking of fluid/particulate 4 or food to the food cooker.

In the embodiment shown in FIG. 2, the top cover 20 includes a support surface 22, cover sidewall 24, and a cover flange 26. The top cover 20 is designed much like the base 12 of the bottom container 10, and has a substantially planar surface, which is configured to provide support and stability for connecting spines 30. The cover 20 is designed in such a way that during assembly, a portion of the cover 20, notably the support surface, is received within an inner contents of the bottom container 10 (see FIG. 3). However, the cover 20 can be designed in other ways, which will be discussed in further below.

The support surface 22 is a portion of the cover 20 used to support and connect the spines 30 with sealed inner chamber 2 formed when the bottom container 10 and cover 20 are connected. The support surface 22 includes at least one vent 28 extending from a top surface of the cover 20 through a bottom surface of the cover 20. Each vent 28 is essentially a through-hole or passageway leading into the inner chamber 2. The diameter, shape, and dimensional configuration of each vent 28 may vary. The number of vents 28 and placement may vary, as well. However, in the embodiment shown, multiple vents 28 are positioned in a lattice configuration along the support surface 22. Since each spine 30 is connectable at a vent 28 position, then the shown configuration provides adjustability of the spine 30 placement and utility. Accordingly, such a design allows the food cooker 1 to accommodate various types of foods and/or heat sources.

The cover flange 26 is substantially planar, and the configuration and dimensions of the cover flange 26 substantially correspond to the configuration and dimensions of the flange 16. As a result, the cover flange 26 can be positioned flush with the flange 16 during assembly. In the embodiment shown, the cover flange 26 includes receiving passageways 28 designed large enough to receive projections 18 from the flange 16. The receiving passageway 28, according to the invention, does not engage a surface edge of the cover flange 26, so that the receiving passageway 28 cannot compromise a seal on the inner chamber 2.

With reference to FIG. 2, the cover 20 is shown having a cover sidewall 24. The sidewall 24 connects the support surface 22 to the cover flange 26, and facilitate a concave shape. However it is not necessary that the cover 22 include the sidewall 24. Rather, the support surface 22 may directly connect with the cover flange 26, where the support surface 22 is either substantially planar with respect to the cover flange 26 or spherical in shape. If the cover 20 includes sidewall 24, as illustrated in FIG. 2, or the support surface 22 is spherical, then the cover is capable of retaining particulate along a top surface of the cover 20. Depending on the polygonal configuration of the cover 20, the cover 20 may include a plurality of cover sidewalls 24.

Figure 4:
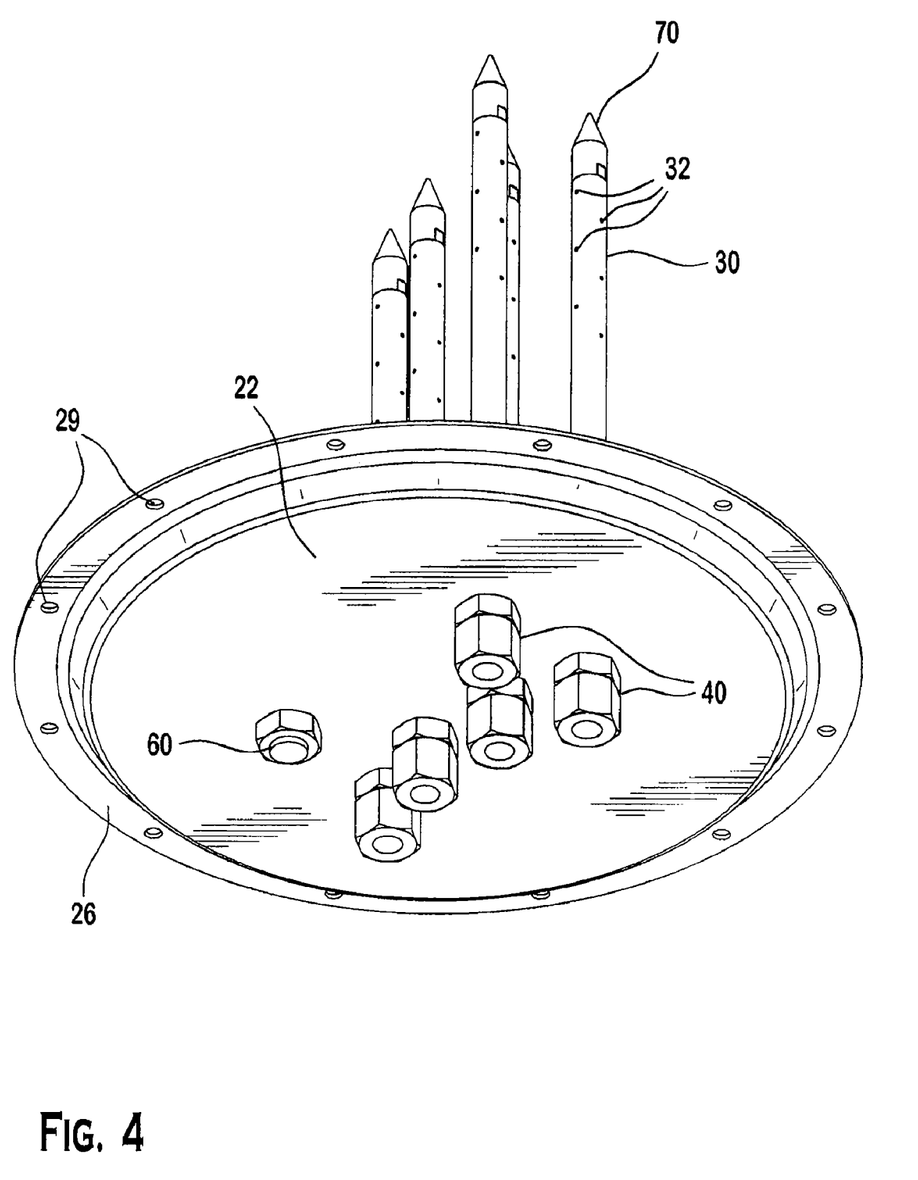
FIG. 4 is a perspective view shown an underside of a cover of the food cooker according to the invention.

In the embodiment shown, a restriction device 60 is used to block or plug a vent 28 when the spine 30 is not connected to the cover 20 (also see FIG. 4). The restriction device 60 maintains a seal of the inner chamber 2, which is constructed when the bottom container 10 and the cover 20 are assembled. The restriction device 60 is designed from a soft material, such as rubber, and includes an outer ring, so that they can be fitted into a vent 28 that is slightly smaller than the diameter of the restriction device 60. In other embodiments, the restriction device 60 can be a mechanism that engages and attaches to the attachment mechanism 50, such a threaded fastener; a mechanism inherent with the attachment mechanism 50.

Like the bottom container 10, the cover 20 is formed from a single material, such as metal, ceramic, or a polymer having a high melting point. However, like the bottom container 10, it is conceivable that the cover 20 components may be prepared separately, and then assembled into an integral construction. It is possible that support surface 22 is coated with a substance, such as polytetrafluoroethylene (PTFE), in order to minimize the sticking of particulates or food to the food cooker.

Figure 3:
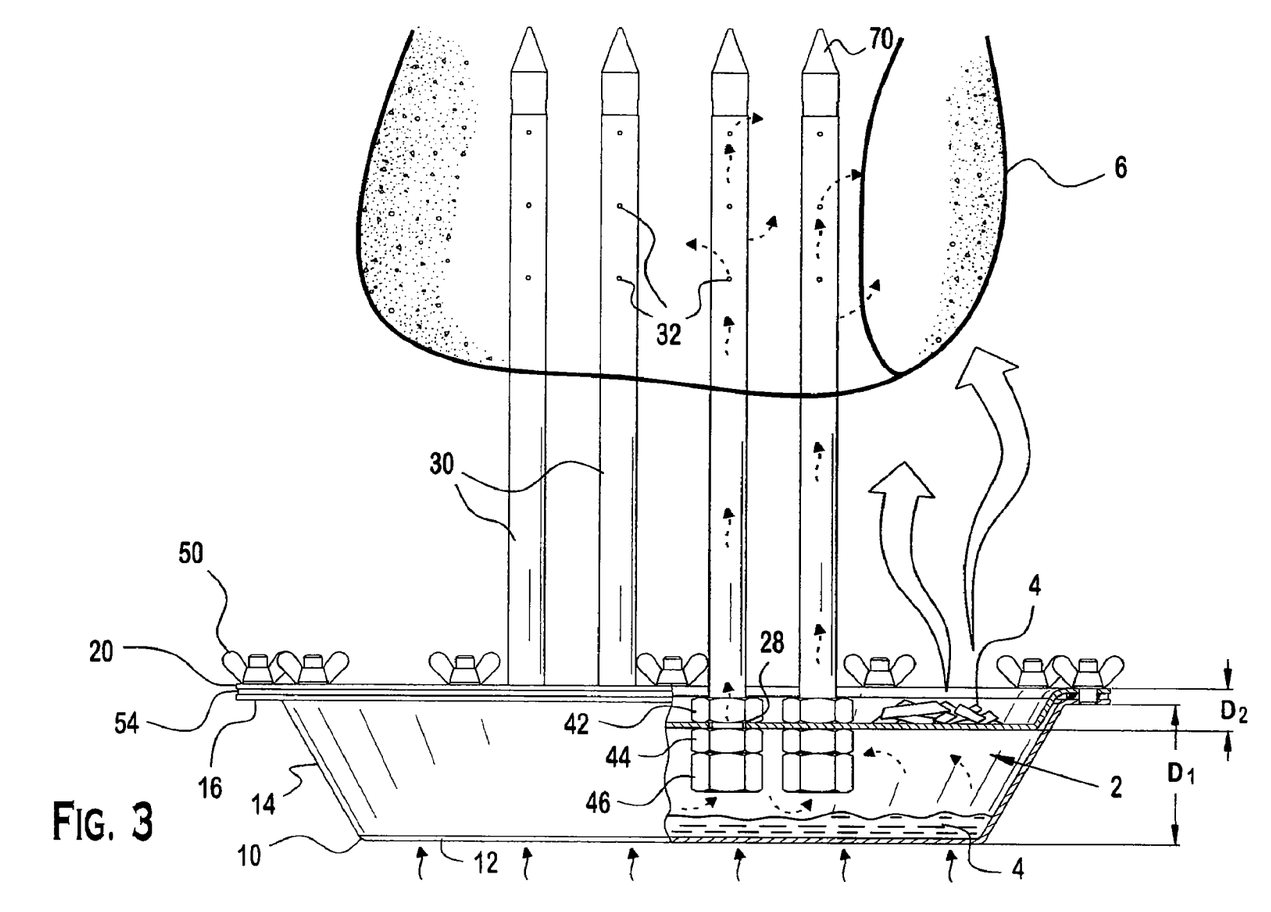
FIG. 3 is a side view of the food cooker of FIG. 2 shown with a partial cross-section.

As shown in FIG. 3, the bottom container 10 has a depth D1, which is a height from the base 12 to a surface of the flange 16. Although the food cooker 10 design does not require a specific depth D1, the depth D1 should be deep enough to provide a space between the base 12 and the cover 20, so that a particulate 4, i.e. liquid or material, may be retained in the inner chamber 2 (see FIG. 3). In the embodiment shown, the depth D1 is around 1-3 inches. Since the cover 20 is also shaped like the bottom container 10, in the embodiment shown, the cover has a depth D2 that is a height from the support surface 22 to a surface of the cover flange 26. The depth D2 should be substantially smaller than the depth D1 of the bottom container 10 so that the inner chamber 2 is maintained. In the embodiment shown, the depth D2 of the cover 20 extends into the chamber 2 when the cover 20 is positioned on top of the bottom container 10, which provides the cover 20 as having a concave shape. However, it is also conceivable to have the support surface 22 extends out of the chamber 2, when the cover 20 is positioned on top of the bottom container 10, which would provide the cover 20 as having a convex shape. It is also possible that the cover 20 not include cover sidewall 24, and therefore, the cover 20 would have a substantially planar surface.

The bottom container 10 and the cover 20 have substantially the same dimensions in the embodiment shown (i.e. measuring diameter and circumference of flanges 16, 26). However, inner dimensions of the base 12 and support surface 22 should differ, where the support surface 22 dimensions are normally smaller than the dimensions of the base 12. This allows the bottom container 10 to receive a portion of the cover 20. In other embodiments, the dimensions may be identical. For instance, if the cover 20 has a convex shape, where the support surface 22 extends away from the base of the bottom container 10.

Figures 5, 6:
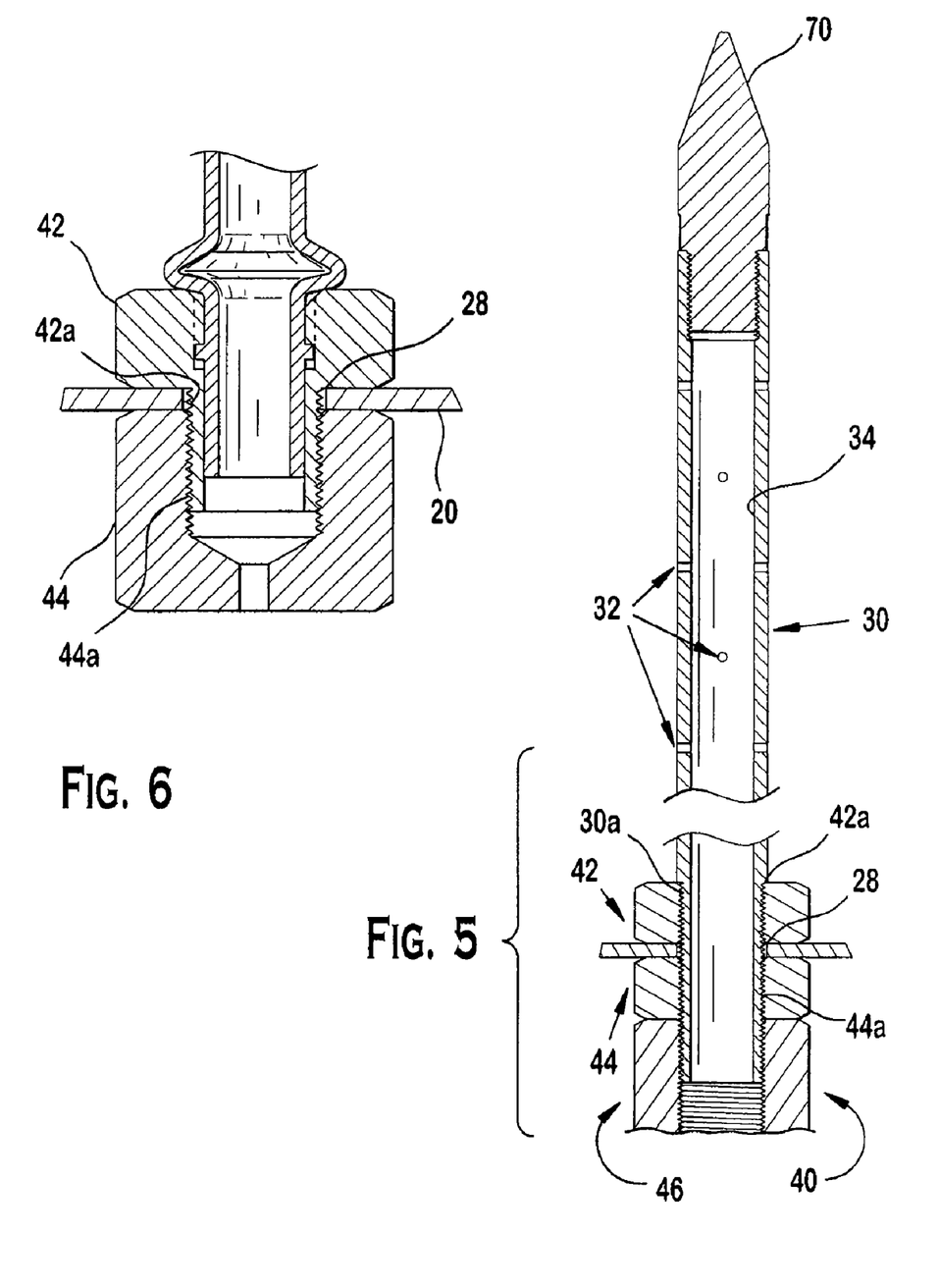
FIG. 5 is a cross-sectional view of the spine, removable tip, and attachment mechanism of a food cooker according to the invention.
FIG. 6 is a close-up cross-sectional view showing another attachment mechanism according to the invention.

Referring now to FIG. 5, the attachment mechanism 40 is shown, which rigidly connects with the support surface 22 of the cover 20. According to the invention, the attachment mechanism 40 connects to the cover at each vent 28 location. In the embodiments shown, the attachment mechanism includes at least one hollow brace 42, 44 as well as a valve system 46. An external hollow brace 42 connects with a top surface of the cover 20, while an internal hollow brace 44 connects with a bottom surface of the cover 20.

In the embodiment shown, the external and internal hollow braces 42, 44 both rigidly attach to the surfaces of the cover 20. For instance, the external and internal hollow braces 42, 44 may be welded or attached using an adhesive. In other embodiments, the attachment mechanism 40 is forcibly fixed along the surfaces of the cover 20 when connected with the spine 30. The support surface 22, which is a rigid material, actively supports attachment mechanism 40.

In the embodiment shown in FIG. 5, the attachment mechanism 40 includes an internal thread formed along hollow inner surface 42a, 44a of each brace 42, 44. This internal thread is engageable with an external thread provided on an outer surface of the spine 30. The external threads of the spine 30 connect with the internal thread of the braces 42, 44 to forcibly fix the spine 30 at a vent 28 location. Such a design allows quick and easy connection of the spine 30, while also promoting stability and limiting linear motion.

In another embodiment, as shown in FIG. 6, the outer brace 42 includes a threaded fastener 42b extending through the vent 28 and engaging the threaded inner surface 44a of the internal brace 44. Such a design allows the braces to connect with each other and rigidly attach with the cover without a weld or any adhesive. Friction and pressure, along the support surface 22 promotes stability and limits linear motion of the connecting spine 30.

A valve system 46 is shown in FIG. 5, although the type of valve used is not. In the shown embodiment, the valve system 46 contacts the internal brace 44 and connects with the spine 30. However, it is not necessary that the valve system 46 be included with the attachment mechanism 40. In fact, it is not necessary that the food cooker 1 include at least one valve system 46. A further discussion of the valve system 46, including the type of valves used, will be provided below.

Figure 7:
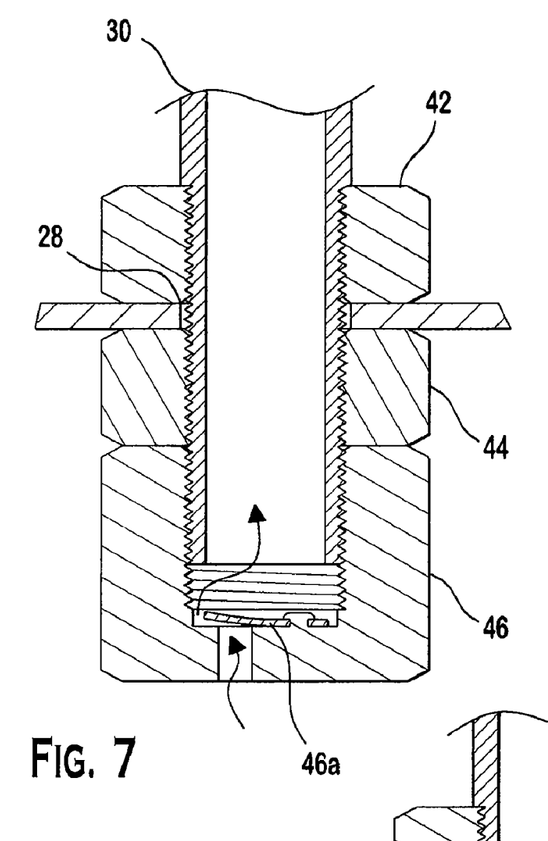
FIG. 7 is a close-up cross-sectional view of a spine connecting to an attachment mechanism having a valve system according to the invention.

Referring to FIG. 7, the food cooker 1 is shown with a valve system 46, configured as a pressure relief valve 46a. The valve system 46 connects to the attachment mechanism 40, and regulates the flow of a fluid/particulate 4 (i.e. gases, liquids, fluidized solids, or slurries) by opening, closing, or partially obstructing a passageway from the inner chamber 2 into the hollow cavity 34 of the spine 30. When opened, fluid/particulate 4 flows into the hollow cavity 34 of the spine 30 in a direction from higher pressure to lower pressure. In the embodiment shown, the valve system 46 is substantially automated, driven by changes in pressure, temperature, or flow. For instance, the pressure relief valve 46a includes a diaphragm that activates the valve system 46. However, other types of known valves could be used, including but not limited to pistons, springs, ball valves, etc.

In the alternative, the valve system 46 may be mechanically activated, whereby the user controls the valve system 46. For instance, a valve system 46 could be used in place of the restriction device 60, mechanically sealing a specific vent location, such as a butterfly type valve, which closes off the inner chamber 2 by not allowing fluid/particulate 4 from flowing through the vent 28.

Figure 8:
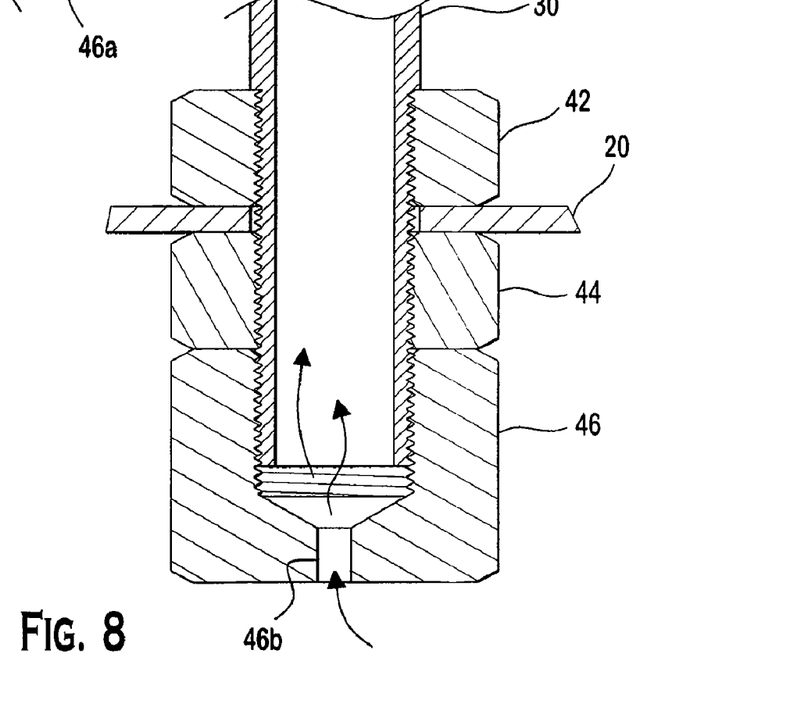
FIG. 8 is a close-up cross-sectional view showing an alternate valve system of the attachment mechanism according to the invention.

Referring to FIG. 8, the shown valve system 46 merely includes a passageway 46b extending from the inner chamber 2 and through a bottom piece of the valve system 46. The passageway 46b connects the inner chamber 2 to the vent 28, and is substantially smaller in size that the vent 28 (i.e. diameter). When pressure builds in the inner chamber 2, as the fluid/particulate 4 is heated, the fluid/particulate 4 is directed more quickly through the smaller passageway 46b than a larger opening.

According to the invention, the spine 30 is a hollow tubular member having two open ends. Additionally, the spine 30 includes numerous perforations 32 positioned along an outer surface of the spine 30, which extend through the tubular member and into a hollow cavity 34. A proximal end of the spine 30 connects to the cover 20 leading into inner chamber 2, while the distal end is configured to connect with the removable tip 60. The perforations 34 provide an open route into the inner chamber 2 from outside the food cooker 1, in the embodiment shown. The spine 30 is manufactured from a rigid material, such as metal or ceramic, making the spine 30 stiff so as to limit deformation when spine 30 is placed into the food 6.

Figures 9, 10:
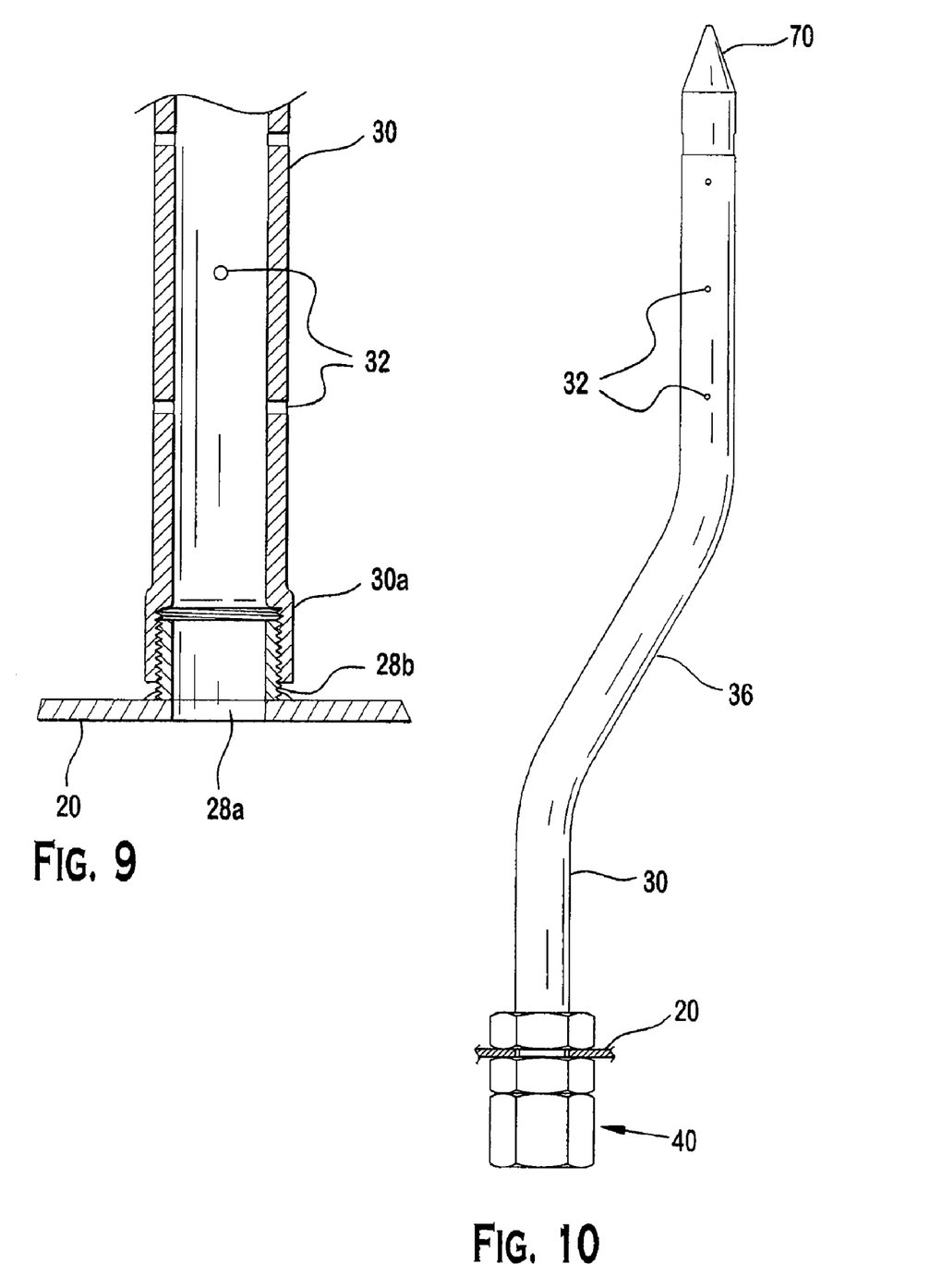
FIG. 9 is a close-up cross-sectional view of another embodiment of a cover and spine according to the invention.
FIG. 10 is an alternate embodiment of a spine according to the invention.

Referring to the embodiment of FIG. 9, the attachment mechanism 40 and valve system 46 are not utilized. Rather, the vent 28 includes a tubular member 28a that extends away from the support surface 22 of the cover, and is then directly connectable with the spine 30, either connecting to an internal or external surfaces of the tubular member 28a. In the embodiment shown, the tubular member 28a may be an extruded projection of the vent 28, or may be a separate component that rigidly attaches to the vent 28. Either way, the tubular member 28 provides a rigid support for the connecting spine 30. In order for the spine 30 connect with the tubular member 28, the spine 30 should include a corresponding connecting member 30a. In the embodiment shown, the connecting member 30a is an extruded portion of the spine 30 that is engageable with the tubular member 28, which so happens to receive the tubular member 28. The connecting member 30a could screw on the tubular member 28, or be attached by fastener, such as a cotter pin.

Figure 11:
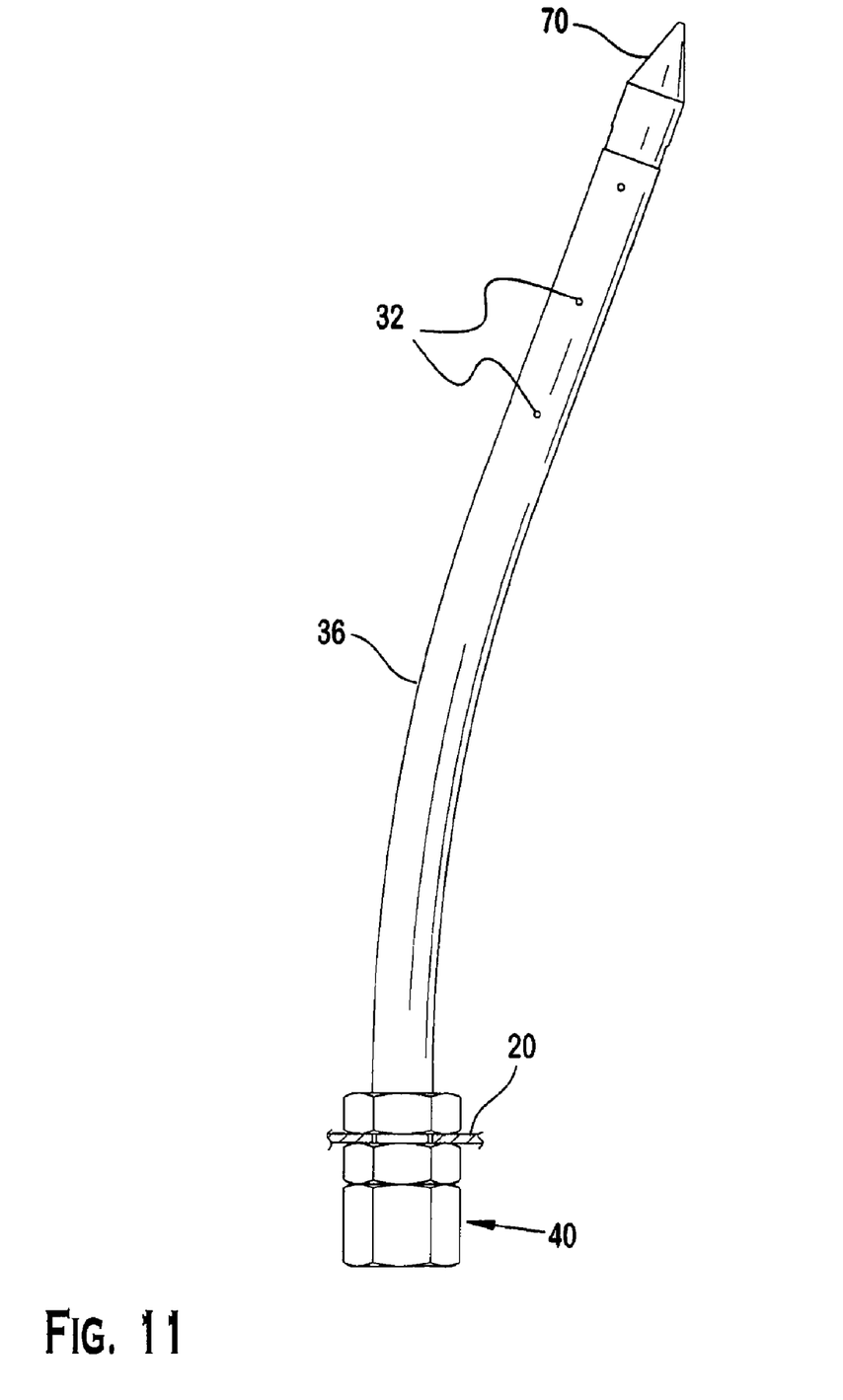
FIG. 11 is another alternate embodiment of a spine according to the invention.

Referring back to FIG. 5, the spine 30 is shown rigidly attached to the cover 20, and more specifically to the attachment mechanism 40. The spine 30 connects with the attachment mechanism 40 using a thread connection structure, as discussed. However, in another embodiment, the spine 30 may securely connect directly with the cover 20, as shown in FIG. 11.

The spine 30 is adjustable, because it is removable and positionable at various vent 28 locations. Since vents 28 are positioned along the support surface 22 of the cover 20 in a grid array, spine 30 placement may vary. This design assists in accommodating various types and shapes of food. Furthermore, to compliment adaptability of spine 30 placement, the spine 30 may be manufactured having various shapes.

In the embodiment shown in FIG. 5, the spine 30 is substantially straight, and extending substantially orthogonal from the support surface 22 of the cover. However, the spine 30 may have an offset 36. As shown in FIG. 10, the spine 30 includes an offset that is a bend substantially in a middle section of the spine 30. In another embodiment, as shown in FIG. 11, the spine 30 includes an offset 36 making the spine 30 extend at angle from the support surface 22 of the cover 20. As a result, spines 30 having different shapes and configurations may be used to further adaptability of the food cooker 1. For instance, FIG. 1 shows an optional arrangement of the spines 30, whereby some of the positioned spines 30 include the offset 36 while other spines 30 are substantially straight.

Referring back to FIG. 5, a tip 70 is shown connecting to a distal end of the spine 30. In the embodiment shown, the tip 70 is conical in shape. However, the tip 70 may be blunt shaped, or any shape capable of penetrating food. The removable tip 70 seals the distal end of the spine 30, so that the hollow cavity 34 is closed. Any fluid/particulate 4 released from the inner chamber 2 is directed through the vent 28 and up the hollow cavity 34. Since the removable tip 70 closes an open end of the spine 30, particulate 4 is directed through the perforations 32. Additionally, since the tip 70 is removable, the tip 70 and spine 30 can be cleaned much more efficiently and easily.

The tip 70, as shown, includes exterior threads that engage interior threads along the hollow cavity 34 of the spine 30. However, other attachment techniques are possible, which may vary use of different fittings and connectors. For instance, the tip 70 could be prepared having a passageway that extends through the tip 70 and spine 30, and received by a cotter pin.

Referring to FIGS. 1-3, the securing mechanism 50 is shown as a device sealing an inner chamber 2, by closing the bottom container 10 and the cover 20 together. In the embodiment shown, the securing mechanism 50 are wing nuts that connect with the projections 18 extending away from the base 10. These projections 18 are threaded and extend through passageways 29 in the cover flange 26 that correspond with the placement of the projections 18. The shown securing mechanism 50 is just one type of fastener capable of completing the connection between the bottom container 10 and the cover 20, but other fasteners may be used. In fact, the securing mechanism 50 can be chosen from a variety of means or mechanisms capable of providing a connection between the bottom container 10 and cover 20. For instance, in FIG. 13, the cover 20 is adapted to engaged with and thread onto the bottom container 10. In other embodiments, a closure ring could be used to increase the force required to draw the bottom container 10 and cover 20 together, thereby increasing the compressive force between the two, as well as the sealing member 54 positioned there between.

A description of the food cooker 1 and its many components is complete, and assembly of the food cooker 1 will now be discussed.

Before assembly, a user will select the type of food 6 to cook over the heat source, as well as the type of fluid/particulate 4 to prepare the food 6 with. The fluid/particulate 4 is placed inside the bottom container 10, and the cover 20 is connected from above. Next, the placement and position of at least one spine 30 is selected. Each of the selected spines 30 are connected to the cover using an attachment mechanism 40. The removable tip 70 is then connected to the spine 30. If a vent 28 is not suitable for use, then the restriction device 60 may be positioned to seal the unused vent 28. If the utilized valve system 46 includes a way to seal the vent 28 without the restriction device 60, then the user can mechanically close the vent 28 using that valve system 46. In addition, the valve system 46 may be of such design, that the valve system 46 will not automatically release fluid/particulate 4 through the vent 28, unless the spine 30 is connected.

Once the food cooker 1 is assembled, then food is positioned on top of the at least one spine 30 and the cover 20 provides the support. If the cover 20 has a pie plate shape, as discussed above, then the cover 20 can hold a second type of fluid/particulate 4 or may collect matter cooked from the food 6. While heat is directed to an underside of the bottom container 10, the fluid/particulate 4 builds pressure in the inner chamber 2 which then is directed through the valve system 46 and through the inner cavity of the spine 30. The spines 30, having perforations along the surface, direct the pressurized fluid/particulate 4 through the perforations and into the food 6. As a result, the food is more thoroughly and efficiently cooked.

Although the food cooker 1 is described for use with a barbecue grill, it is also possible to use the food cooker 1 with any other heating sources, such as an oven or another cooking appliance.

Besides these, the configurations described in the above-described embodiments can be selected optionally or can be changed appropriately in to other configurations without departing from the spirit and scope of the present invention.

What is claimed is:
1. A food cooker, comprising
a bottom container;
a cover connectable with the bottom container;
a spine securable at a plurality of positions along the cover, the spine having a hollow interior and perforations along an exterior surface; and
a securing mechanism sealing the bottom container and cover to form a sealed inner chamber;
wherein the cover includes a plurality of vents positioned along a top surface and opening into the sealed inner chamber.
2. The food cooker according to claim 1, wherein the cover is a dish shaped container having either a convex or concave shape with respect to the bottom container.

3. The food cooker according to claim 2, wherein the cover has a depth smaller than a depth of the bottom container.

4. The food cooker according to claim 1, further comprising at least one attachment mechanism connecting the spine with the cover.

5. The food cooker according to claim 4, wherein the attachment mechanism includes at least one hollow brace and a valve system.

6. The food cooker according to claim 5, wherein the valve system seals one of the plurality of vents.

7. The food cooker according to claim 5, wherein at least one surface of the cover rigidly supports the attachment mechanism.

8. The food cooker according to claim 5, wherein the attachment mechanism includes an external and internal brace, the external brace supported by a top surface of the cover and the internal brace supported by an underside surface of the cover.

9. The food cooker according to claim 7, wherein each brace rigidly attaches to the surface of the cover.

10. The food cooker according to claim 8, wherein the attachment mechanism includes an internal thread formed on one brace and external thread of another brace, the internal thread and the external thread engageable with each other to seal the vent.

11. The food cooker according to claim 5, wherein the attachment mechanism includes an internal thread engageable with an external thread of the spine, the attachment mechanism sufficient to prevent linear motion.

12. The food cooker according to claim 1, further comprising a sealing member positioned between the bottom and the cover.

13. The food cooker according to claim 1, further comprising a pressure relief valve positioned between an inner chamber and the spine.

14. The food cooker according to claim 1, wherein the spine includes an offset.

15. The food cooker according to claim 14, wherein the offset is a bend substantially in a middle section of the removable spine.

16. The food cooker according to claim 1, further comprising an extruded portion extending from the vent and connectable with the spine.

17. The food cooker according to claim 1, further comprising at least one attachment mechanism connecting the spine with the cover, the at least one attachment mechanism includes a valve system.

18. A food cooker, comprising
a bottom container;
a cover connectable with the bottom container;
a spine securable at a plurality of positions along the cover, the spine having a hollow interior and perforations along an exterior surface;
a removable tip connected to a distal end of the spine; and
a securing mechanism sealing the bottom container and cover to form a sealed inner chamber.

19. The food cooker according to claim 18, wherein the removable tip is conical in shape.

20. The food cooker according to claim 19, wherein the removable tip seals a distal end of the hollow interior.

21. A food cooker, comprising
a bottom container;
a cover connectable with the bottom container and having a vent positioned along a top surface;
a spine securable at a plurality of positions along the cover, the spine having a hollow interior and perforations along an exterior surface; and
a securing mechanism sealing the bottom container and cover to form a sealed inner chamber with the vent opening into the inner chamber.

22. The food cooker according to claim 21, further comprising an extruded portion extending from the vent and connectable with the spine.

23. The food cooker according to claim 21, wherein the vent is connectable with a restriction device that seals the vent.

24. The food cooker according to claim 21, further comprising an attachment mechanism connecting the spine with the cover at the vent.

25. The food cooker according to claim 24, wherein the attachment mechanism includes at least one hollow brace and a valve system that seals the vent.

26. The food cooker according to claim 24, wherein the mechanism includes an external and internal brace, the external brace supported by a top surface of the cover and the internal brace supported by an underside surface of the cover.

27. The food cooker according to claim 24, wherein the attachment mechanism includes an internal thread engageable with an external thread of the spine, the attachment mechanism sufficient to prevent linear motion.

* * * * *